July 25, 1939. W. R. YOUNG 2,167,541
CORD REEL FOR ELECTRIC PLUG CAPS
Filed Sept. 9, 1937
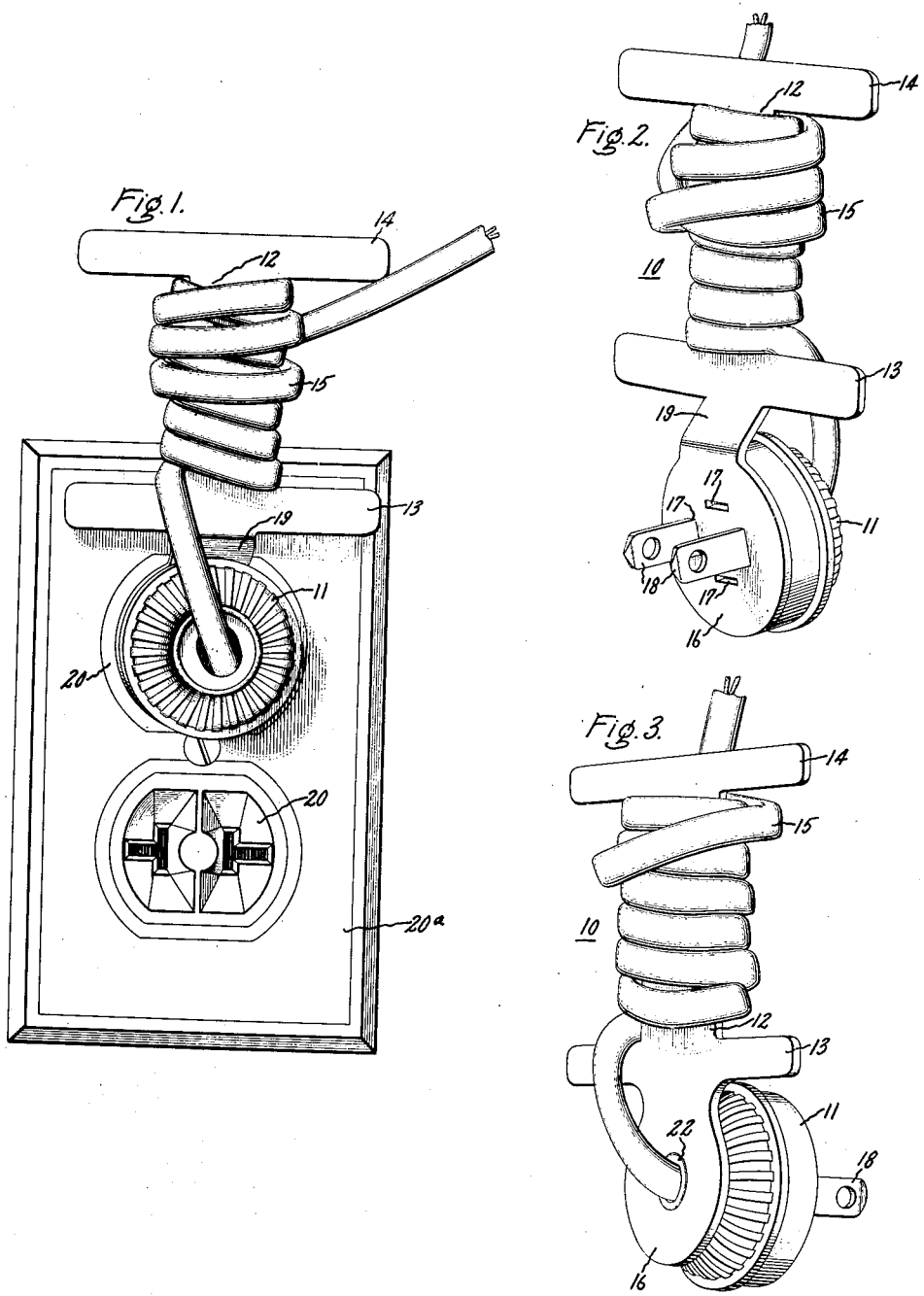
Inventor:
William R. Young,
by Harry E. Dunham
His Attorney.

Patented July 25, 1939

2,167,541

UNITED STATES PATENT OFFICE 2,167,541

CORD REEL FOR ELECTRIC PLUG CAPS

William R. Young, Fairfield, Conn., assignor to General Electric Company, a corporation of New York Application September 9, 1937, Serial No. 163,078

3 Claims. (Cl. 173—361)

This invention relates to improvements in cord reels used to take up slack in an electric cord.

It is an object of the invention to provide a small and durable reel structure by means of which the length of electric cord may be adjusted, and more particularly to mount the reel upon the plug cap for convenience of use, and to enable the reel to absorb any pull upon the cord which might damage the connection between the cord wires and cap.

In the accompanying drawing, Fig. 1 is a view of the combined plug cap and reel embodying the invention, the plug cap being mounted in a convenience outlet; Fig. 2 is a perspective view of the cap and reel shown in Fig. 1; and Fig. 3 is a view of another form of the invention.

Referring to the drawing, the reel structure as a whole is indicated by the numeral 10 and the reel is shown in assembled relationship with a plug cap 11, so that the assembly may be carried about and used as a unit. The reel comprises an H-shaped structure including a stem 12 and attached cross-arms 13 and 14 which act to confine the windings of a cord 15 wound on the stem 12. In order to mount the reel upon a plug cap, the reel is provided with a base portion 16.

In the form of the invention shown by Figs. 1 and 2, the reel is mounted upon the cap by means of openings 17 formed in the base 16 and which are adapted to receive the prongs 18 of the plug cap. The main body of the reel is offset from the base portion 16 by means of an inclined extension 19 which acts to space the reel from the wall when the reel is mounted in operative position. By spacing the main body of the reel away from the wall ample room is provided to receive a quantity of electric cord which may be wound on the reel. As shown in Fig. 2, two sets of openings 17 are provided to enable the user to mount the reel in positions 90 degrees apart, thus adapting it to varying conditions of use and since the reel cannot rotate upon the plug cap the reel is held in whatever position it is placed. After the reel is mounted upon the plug cap the cap prongs may be inserted into a convenience outlet 20 and the reel is thereby held in tightly clamped position between the outlet and the cap. The outlet is surrounded by a face plate 20a which may be formed of a metal or of molded composition.

The reel thus described is simple in construction and may be applied to any standard plug cap by means of the openings 17, thus obviating the need for special cap structures and attaching means to mount the reel. The reel may be manufactured and marketed as a separate article and when purchased may be easily and quickly installed on a standard cap by the purchaser.

In the form of the invention shown by Fig. 3 the reel is secured to the front of the cap by means of an eyelet or hollow rivet 22 placed in the center of the cap. The eyelet is fastened in the usual opening which is formed in the cap to receive the electric cord. Hence it functions not only to hold the reel upon the cap but also to receive the cord, so that the latter may be connected to the cap in the customary manner. In addition, the eyelet pivots the reel on the cap so that the reel may be rotated to any position.

In both forms of the invention the reel is formed as an integral structure and advantageously may be punched from a sheet of fiber, or the like. In this manner the reels may be manufactured at low cost. In the form shown by Fig. 1, it may be sold as a separate article or in combination with a standard plug cap. When mounted upon the plug cap the reels aid in protecting the cord from being pulled out of the cap by absorbing any unwarranted pulls upon the cord.

What I claim as new and desire to obtain by Letters Patent of the United States is:

1. In combination, an electric plug cap having an electric cord connected thereto, an H-shaped cord holding reel comprising a flat fiber sheet having a center stem and spaced cross-arms extending outwardly from each end of said stem, said reel being provided with an integral offset mounting portion substantially in alignment with said center stem, and means for securing said mounting portion to said plug cap whereby an excess of the electric cord may be wound on said reel.

2. In combination, an electric plug cap having spaced contact prongs, an H-shaped cord holding reel comprising a flat sheet of material having a center stem and spaced cross-arms extending outwardly from each end of said stem, said reel being provided with an integral offset mounting portion substantially in alignment with said center portion, said mounting portion being provided with a plurality of pairs of spaced openings, each pair being adapted to receive said contact prongs for mounting said reel on said plug cap in a plurality of positions.

3. In combination, an electric plug cap having an electric cord connected thereto, an H-shaped cord holding reel comprising a flat sheet of material having a center stem and spaced cross-arms extending outwardly from each end of said stem, said reel being provided with an integral offset mounting portion substantially in axial alignment with said center stem, and an eyelet passing through said plug cap and mounting portion for pivotally mounting said reel on said cap, said eyelet receiving said cord for attachment to said plug cap.

WILLIAM R. YOUNG.